United States Patent [19]

Mize et al.

[11] Patent Number: 5,264,522

[45] Date of Patent: Nov. 23, 1993

[54] HEAT-CURABLE FLUOROSILICONE RUBBER COMPOSITION AND CURED PRODUCT THEREOF

[75] Inventors: Kipp J. Mize, Lkwd, Calif.; Masaharu Takahashi, Annaka, Japan; Yasushi Yamamoto, Takasaki, Japan; Hirofumi Kishita, Annaka, Japan; Masayuki Oyama, Takasaki, Japan

[73] Assignee: Shin-Etsu Chemical Co., Ltd., Tokyo

[21] Appl. No.: 942,503

[22] Filed: Sep. 10, 1992

[51] Int. Cl.⁵ ............................................... C08K 3/00
[52] U.S. Cl. .................................. 524/847; 528/15; 528/35; 528/42; 524/493; 524/862
[58] Field of Search ................... 528/15, 42, 35; 524/862, 847, 493

[56] References Cited

U.S. PATENT DOCUMENTS

| | | |
|---|---|---|
| 3,408,325 | 10/1968 | Hittmair et al. |
| 3,474,064 | 10/1969 | Hittmair et al. |
| 3,624,028 | 11/1971 | Drake |
| 3,671,480 | 6/1972 | Wada et al. |
| 3,996,187 | 12/1976 | Travnicek |
| 3,996,189 | 12/1976 | Travnicek |
| 4,089,833 | 5/1978 | Simpson |
| 4,100,136 | 7/1978 | Carter et al. ........................ 528/42 |
| 4,857,564 | 8/1989 | Maxson |

*Primary Examiner*—Melvyn I. Marquis
*Attorney, Agent, or Firm*—Birch, Stewart, Kolasch & Birch

[57] ABSTRACT

The present invention provides a heat-curable fluorosilicone rubber composition to be cured by hydrosilation reactions and having outstanding physical properties, especially improved transparency and processability, said composition comprising (A) a polydiorganosiloxane having at least two unsaturated aliphatic hydrocarbon groups and represented by the general formula (1):

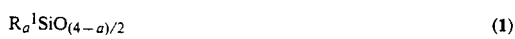

wherein $R^1$ represents a substituted or unsubstituted monovalent hydrocarbon group containing 0.01 to 15 mole % of an unsaturated aliphatic hydrocarbon group, a is a positive number of from 1.95 to 2.05.

(B) a polyorganohydrogensiloxane having at least three hydrogen atoms directly bonded to silicon atoms in a molecule and represented by the general formula:

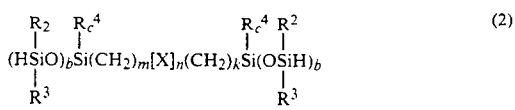

wherein $R^2$, $R^3$ and $R^4$ independently represents a substituted or unsubstituted monovalent hydrocarbon group, X represents $CF_2$ or $C_3F_6O$, b is equal to 2 or 3, c is equal to 1 or 2, b+c=3, m is an integer of 2 or more, n is an integer of 1 or more, and k is an integer of 2 or more, (C) a silica filler having a specific surface area of at least 50 m²/g, and (D) an addition reaction catalyst.

10 Claims, No Drawings

HEAT-CURABLE FLUOROSILICONE RUBBER COMPOSITION AND CURED PRODUCT THEREOF

BACKGROUND OF THE INVENTION

1. Field of the Invention

This invention relates to a high consistency heat-curable fluorosilicone rubber composition and a fluorosilicone rubber obtained by curing said composition. The heat-curable fluorosilicone rubber composition is cured into a cured product with optical clarity, and can be used for many diverse applications, for example, tubes, gaskets, diaphragms and the like.

2. Description of the Prior Art

The prior art teaches many ideas that relate to silicone rubber compositions with optical clarity. These silicone rubber compositions can be used for many diverse applications requiring optical clarity, for example, tubes, hoses, diaphragms, packings, contact lenses, etc.

It is necessary to blend an extrusion compatible crosslinker into silicon rubber compositions prior to the extrusion process and the subsequent curing process. Dichlorobenzoyl peroxide is a well-known extrusion compatible crosslinker which is widely used in such silicone rubber compositions. It is an unstable peroxide in the compositions and initiates a free radical reaction that forms crosslinkages between adjacent polymer chains. However, dichlorobenzoyl peroxide has a disadvantage of needing to go through the post cure process to remove harmful decompositional by-products.

As compared with the above peroxide curing compositions, addition catalyzed compositions do not require the time consuming post cure process but typically do to obtain maximum physical characteristics. The prior art teaches many ideas that relate specifically to high consistency silicone rubber compositions which are catalyzed by hydrosilation reactions and cured into silicone rubbers with optical clarity.

Addition reaction occurs between hydrosilyl group and vinyl groups, usually catalyzed by a platinum compound such as chloroplatinic acid, forming Si—C bonds as described in the following formula.

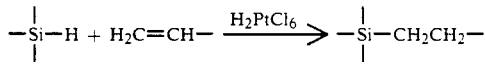

This type of crosslinking system has some advantages over other kinds of vulcanizing agents. Once the proper components are allowed to react together, the composition can be vulcanized rapidly at elevated temperatures or much more slowly at room temperature.

Transparent silicone rubber compositions which can be vulcanize at room temperature are proposed by Hittamair et al (U.S. Pat. No. 3,408,325 and U.S. Pat. No. 3,474,064.)

The prior arts also teach many techniques which greatly enhance the optical clarity of silicone rubbers. One prior art technique of obtaining compositions possessing improved optical clarity uses matching the refractive index of the filler with that of the polydiorganosiloxane by utilizing one or more polydiorganosiloxanes which contain phenyl groups. U.S. Pat. Nos. 3,996,189 and 3,996,187, both to Travnicek, teach that 80 to 95 parts of one or two polydiorganosiloxanes containing from 6 to 16 mole percent phenyl groups can produce a material with adequate optical clarity when mixed with 5 to 20 parts of fumed silica. The same patents teach that the absence of phenyl groups incorporated into a polydiorganosiloxane results in hazy material. Hartlage, in U.S. Pat. No. 3,624,023, also teaches about transparent silicone rubber compositions which are vulcanizable under ambient conditions. This particular patent utilizes a surfacetreated fumed silica filler and a hydroxyl-end blocked polydiorganosiloxane which contains phenyl units.

Polmanteer et. al. in U.S. Pat. No. 4,418,165 teaches optically clear silicone rubber compositions comprising 100 parts by weight of at least one polydiorganosiloxane and 15 to 120 parts by weight of a hydrophobic reinforcing silica filler. It further states specifically that the refractive index of the polydiorganosiloxane does not have to be matched with that of the silica filler to obtain optically clear materials. The compositions of this invention can utilize polydimethylsiloxanes and poly-3,3,3-trifluoropropylmethylsiloxanes as long as the polydiorganosiloxanes chosen can be vulcanized to produce transparent compositions in the absence of silica fillers. The optical clarity is obtained through the use of a hydrophobic reinforcing silica filler consisting of surface-treated particles consisting essentially of $SiO_{4/2}$ units wherein substantially all of the particles are of such a size that when properly incorporated into the polydiorganosiloxane, they do not appreciably scatter light and hence result in optically clear compositions regardless of the refractive index of the polydiorganosiloxane employed.

SUMMARY OF THE INVENTION

An object of the present invention is to provide a heat-curable high consistency fluorosilicone rubber composition having an improved processability and giving a cured product having an improved optical clarity.

Another object of this invention is to provide a heat-curable silicone rubber composition which, when cured, gives a silicone rubber which provides a high tear strength and which is useful as medical grade material, gasket and diaphram material, and for many other diverse applications.

We have found that by blending as a crosslinking agent a polyhydrogensiloxane having a fluorinated polyether group or fluorinated alkylene group and at least three hydrogen atoms directly bonded to silicon atoms in a molecule and represented by the following general formula:

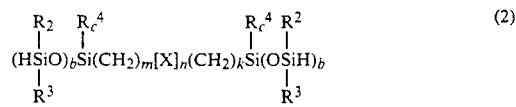

wherein $R^2$, $R^3$ and $R^4$ independently represent the same or different unsubstituted or substituted monovalent hydrocarbon group, X represents $CF_2$ or $C_3F_6O$, b is 2 or 3, c is 1 or 2, b+c is 3, m is an integer of 2 or more, n is an integer of 1 or more, and k is an integer of 2 or more, into a polydiorganosiloxane having at least two unsaturated aliphatic hydrocarbon group in a molecule and represented by the following general formula:

wherein $R^1$ represents an unsubstituted or substituted monovalent hydrocarbon group provided that 0.01 to 15 mole % of $R^1$ is an unsaturated aliphatic hydrocarbon group, and a is a positive number of 1.95 to 2.05.

The prior art polyorganohydrogensiloxane crosslinkers containing no fluorinated groups are difficult to uniformly disperse into a polydiorganosiloxane, especially a trifluoropropylmethylpolysiloxane, fail to give a good optical clarity to a cured product obtained therefrom. On the other hand, the use of the polyorganohydrogensiloxane of formula (2) can give a high consistency silicone rubber composition which can minimize the time for dispersing the crosslinker into the composition as well as the time for addition reaction under a platinum type catalyst and can give a cured product having an excellent optical clarity because of high polymer solubility of the organohydrogenpolysiloxane of formula (2) and an improved tear strength.

U.S. Pat. No. 4,857,564, issued to Maxson, teaches high consistency organosiloxane elastomer compositions curable by a platinum-catalyzed hydrosilation reaction with improved tear strength and elongation by mixing a gum-type polydiorganosiloxane and a liquid diorganovinylsiloxy-terminated polydiorganosiloxane. U.S. Pat. No. 3,671,480 issued to Wada et. al. and U.S. Pat. No. 4,089,833 issued to Simpson, also teach high consistency organosiloxane compositions which can be cured by a platinum catalyzed hydrosilation reaction. However, they do not specifically detail the hydrogensiloxane crosslinkers containing a fluorinated group and having the general formula (2) of the present invention. These patents, along with the others mentioned in the background of this invention, are not included to limit the scope of the current art, and hence they are merely included as reference of the prior art.

Therefore, the present invention provides a heat-curable fluorosilicone rubber composition comprising
(A) a polydiorganosiloxane having at least two unsaturated aliphatic hydrocarbon groups and represented by the general formula:

$$R_a^1SiO_{(4-a)/2} \qquad (1)$$

wherein $R^1$ is a substituted or unsubstituted monovalent hydrocarbon group containing 0.01 to 15 mole % of an unsaturated aliphatic hydrocarbon group and a is a positive number of from 1.95 to 2.05,
(B) a polyorganohydrogensiloxane having at least three hydrogen atoms directly bonded to silicon atoms in a molecule and represented by the general formula:

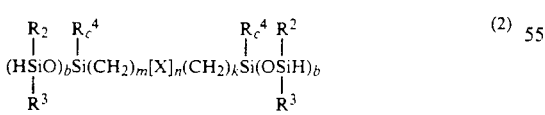

(2)

wherein $R^2$, $R^3$ and $R^4$ independently represent the same or different unsubstituted or substituted monovalent hydrocarbon group, X represents $CF_2$ or $C_3F_6O$, b is equal to 2 or 3, c is equal to 1 or 2, b+c=3, m is an integer of 2 or more, n is an integer of 1 or more, and k is an integer of 2 or more,
(C) a silica filler having a specific surface area of at least 50 m²/g, and
(D) an addition reaction catalyst.

DETAILED DESCRIPTION OF THE INVENTION

The present heat-curable fluorosilicone rubber composition comprises (A) a polydiorganosiloxane having at least two unsaturated aliphatic hydrocarbon groups, (B) a polyorganohydrogensiloxane having at least three hydrogen atoms directly bonded to silicon atoms (at least three ≡Si—H bonds) in a molecule, (C) a silica filler having a specific surface area of at least 50 m²/g, and (D) an addition reaction catalyst.

The polydiorganosiloxane of component (A) has at least two unsaturated aliphatic hydrocarbon groups and is represented by the general formula (1).

In the formula, $R^1$ is a substituted or unsubstituted monovalent hydrocarbon group comprising 0.01 to 15 mole %, preferably 0.02 to 10 mole % of an unsaturated aliphatic hydrocarbon group. When the content of the unsaturated aliphatic hydrocarbon groups is less than 0.01 mole %, there is not obtained a cured product having a desired tear strength.

The unsaturated aliphatic hydrocarbon group should preferably have 2 to 8 carbon atoms including vinyl and allyl groups. Monovalent hydrocarbon groups other than the unsaturated aliphatic hydrocarbon group should preferably have 1 to 10 carbon atoms, preferably 1 to 8 carbon atoms including an alkyl group such as methyl, ethyl, trifluoropropyl groups, a halogenized alkyl group, an aryl group such as phenyl group, a halogenized aryl group and an aralkyl group such as benzyl group. The present monovalent hydrocarbon group should preferably contain from 10 to 55 mole %, more preferably from 20 to 55 mole % of a fluoroalkyl group having 1 to 10 carbon atoms, especially 1 to 8 carbon atoms. Preferred example of component (A) includes a trifluoropropylmethylpolysiloxane containing 0.01 to 15 mole % of vinyl or allyl group.

In the above formula (1), a is a positive number of from 1.95 to 2.05. If a is less than 1.95, there is obtained an unstable linear polymer which is easy to gelatinize. On the other hand, if a is over 2.05, there is obtained a polymer with too high molecular weight.

The polydiorganosiloxane of component (A) can be prepared by the prior art technique in the presence of an alkali catalyst.

The polyorganohydrogensiloxane of component (B) is represented by the general formula (2).

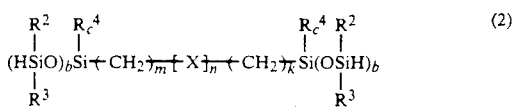

(2)

In formula, $R^2$, $R^3$ and $R^4$ independently represents the same or different substituted or unsubstituted monovalent hydrocarbon group having preferably 1 to 10 carbon atoms, more preferably 1 to 8 carbon atoms. Examples of the monovalent hydrocarbon groups include those exemplified as in $R^1$. X is $CF_2$ or $C_3F_6O$, b is equal to 2 to 3, c is equal to 1 or 2 and b+c=3. m is an integer of 2 or more, preferably 2 to 6, n is an integer of 1 or more, preferably 1 to 10, and k is an integer of 2 or more, preferably 2 to 6.

The polyorganohydrogensiloxane should have at least three hydrogen atoms directly bonded to silicon atoms in a molecule and is an effective multiple functional crosslinker to a fluorosilicone rubber composition catalyzed by hydrosilylation reaction. The polyorganohydrogensiloxane can be prepared by any known methods.

If the crosslinker is too small in quantity, insufficient cross-linking will occur. If the quantity is too much, the tear strength and other physical properties will be reduced. The polyorganohydrogensiloxane of formula (2) should preferably be added in such an amount that a ratio of the mole percent of HSi groups contained therein to the total mole percent of unsaturated aliphatic hydrocarbon groups contained in polydiorganosiloxane (A) is in the range of 0.5 to 5. The polyorganohydrogensiloxane component (B) should preferably be blended in an amount of from 0.05 to 10 parts by weight, preferably, 0.5 to 5 parts by weight per 100 parts by weight of component (A).

Ordinary silica fillers used for prior art silicone rubber compositions can be employed as component (C), and can be exemplified by finely divided powders of silica such as fumed silica, calcined silica, precipitated silica and the like. The specific surface area (BET) of the silica filler should have at least 50 m²/g, preferably 50 to 400 m²/g, as measured by the nitrogen absorption method to improve mechanical strength, and the particle size thereof is preferably from 5 mµ to 10 µm, more preferably 5 mµ to 1 µm. The silica filler particles, including both primary silica particles and aggregates of such primary particles, must be of such a size and shape that when properly incorporated into the polydiorganosiloxane or blend of polydiorganosiloxanes they do not appreciably scatter light and alter the optical clarity of the material. In addition, the amount of filler added also contributes to the amount of haze present in the material, therefore, formulation alterations and batch to batch variations can have an impact on the translucent characteristics of the compounded material. The quantity of silica to be incorporated into the composition should preferably be from 1 to 100 parts by weight, more preferably 10 to 70 parts by weight per 100 parts by weight of component (A).

The addition reaction catalyst added to the composition as component (D) is preferably a soluble platinum compound such as chloroplatinic acid, or a complex of platinum chloride and an olefine such as ethylene, propylene, butadien and cyclohexane. The quantity of compound (D) required can be from 0.1 to 1,000 ppm, preferably 1 to 200 ppm as metal platinum based on the weight of the composition.

The heat curable silicone compositions of this invention are prepared by kneading mixtures of the components by means of a two-roll mill, Banbury mixer, or other mixing device, together with a process aid or surface treatment additive. Suitable surface treating additives are well known in the art and include, but are not limited to, hydroxyl terminated short chain polydiorganosiloxane fluids and hexaorganodisilazanes. Other various components may also be added to improve specific physical properties of the material such as heat stabilizers and pigments. In order to further improve the storage stability of the product, acetylene alcohols, organic phosphorous compounds or organic amines and other retardants known to the art may be added as well.

The ingredients of the present invention can be blended together anywhere from about 15 minutes to roughly 5 hours, depending upon the amount of material being processed, the viscosity of the material, and the shear rate to which the material is subjected during processing. Irrespective of the type of mixer used, blending of the polydiorganosiloxane(s), silica, and silica treating agent including a process aid and a dispersion is continued while the composition is heated at temperatures from about 100° to 250° C. Curable compositions of this invention are prepared by blending the resultant mixture with the organohydrogensiloxane and the hydrosilation catalyst.

If desired, the silica filler can be treated in the presence of the polydiorganosiloxane or alternately, treatment of the silica can occur before the silica is blended with the other ingredients of the present invention.

Since the fluorosilicone rubber composition according to the present invention contains an addition reaction catalysts such as a platinum-containing catalyst may begin to cure under ambient conditions, it is desirable to package the components in separate parts to achieve long term storage stability.

A cured product results from curing the fluorosilicone rubber composition preferably at a temperature of from 50° to 300° C. for 1 to 30 minutes, and then post-curing the composition at a temperature of 100° to 250° C. for 0 to 8 hours.

The following examples are intended to describe preferred embodiments of the present invention and should not be interpreted as limiting the scope of the invention as defined in the accompanying claims. Unless otherwise specified, all parts and percentages specified in the examples are by weight.

EXAMPLE 1

A fluorosilicone rubber composition was prepared by uniformly mixing the following ingredients (1) to (7) by a 6 inch two-roll mill. The composition was press molded into a sheet shape having 2 mm thick at a temperature of 165° C. for 10 minutes under a pressure of 100 kg/cm² and then post-cured for 4 hours in an oven heated at a temperature of 200° C. The physical properties of the cured sample was measured according to JIS K-6301. The results are shown in Table 1. The results of kneading time of the ingredients are also shown in Table 1.

(1) 100 parts of polyorganosiloxane containing 99.7 mole percent trifluoropropylmethylsiloxane units and 0.3 mole percent methylvinylsiloxane units,
(2) 45 parts of fumed silica having a specific surface area of 300 m²/g,
(3) 10 parts of a short chain hydroxyl-terminated polydimethylsiloxane,
(4) 1.0 part of γ-trifluoropropylmethyltrimethoxysilane (silica treating agent),
(5) 0.43 parts of polyorganohydrogensiloxane containing fluorocarbon unit described by the following formula (crosslinker),

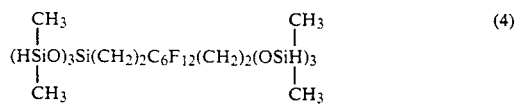

(6) 0.5 parts of chloroplatinic acid, and
(7) 0.1 parts of ethynylcyclohexanol (retardant).

COMPARATIVE EXAMPLE 1

A cured sample for comparison was prepared by the same manner as in Example 1 except that 0.91 parts of polymethylhydrogensiloxane containing no fluorine was used as a crosslinker instead of the polyorganohydrogensiloxane containing fluorocarbon units described above. The physical properties thereof were measured by the same manner as in Example 1. The results were also shown in Table 1.

TABLE 1

|  | Example 1 | Comparative Example 1 |
| --- | --- | --- |
| Kneading time | 2 minutes | 10 minutes |
| Hardness (Shore A) | 58 | 59 |
| Tensile strength (kgf/cm$^2$) | 131 | 124 |
| Elongation (%) | 506 | 521 |
| Tear strength (kgf/cm) | 63 | 41 |

Of special importance is the fact that Example 1 took only roughly 2 minutes on a 6 inch two-roll mill to blend its fluorinated polyorganohydrogen crosslinking agent homogenously into the compounded material whereas the non-fluorinated methylhydrogensiloxane crosslinking agent of Comparative Example 1 displays much lower solubility. The crosslinking agent of Comparative Example 1, which is also in the liquid state at room temperature, took approximately 10 minutes to blend homogenously into the same material. After the blending process, the cured sheet of Example 1 possessed better optical clarity, that is, less haze, than an A.S.T.M sheet of the same approximate 2 mm thickness of Comparative Example 1. As the data shows, tear strength was also significantly improved in Example 1 with the above chosen formulation.

EXAMPLE 2, 3 AND 4

Fluorosilicone rubber compositions were prepared by the same manner as in Example 1 using the following ingredients (1) to (7);

(1) 100 parts of a copolymer containing 99.7 mole percent trifluoropropylmethylsiloxane units and 0.3 mole percent methylvinylsiloxane units,
(2) 50 parts of a fumed silica having a specific surface area of 300 m$^2$/g,
(3) 11 parts of a short chain hydroxyl-terminated polydimethylsiloxane (softening agent.),
(4) 1 part of γ-trifluoropropylmethyltrimethoxysilane (dispersion agent),
(5) 0.5 parts of chloroplatinic acid,
(6) 0.1 parts of ethynylcyclohexanol (retardant), and
(7) 0.48 parts of the following crosslinker.

EXAMPLE 2

The same crosslinker as in Example 1.

EXAMPLE 3

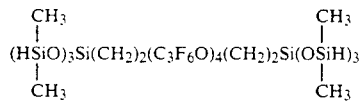

EXAMPLE 4

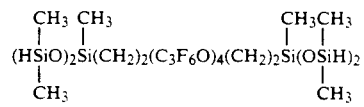

The results are shown in Table 2.

TABLE 2

|  | Example 2 | Example 3 | Example 4 |
| --- | --- | --- | --- |
| Hardness (Shore A) | 64 | 67 | 65 |
| Tensile strength (kgf/cm$^2$) | 119 | 123 | 122 |
| Elongation (%) | 437 | 431 | 461 |
| Tear strength (kgf/cm) | 50 | 47 | 54 |

All three of the particular polyorganohydrogensiloxanes of Examples 2, 3 and 4 mixed to homogeneity with exceptional ease. They all displayed optical clarity with very good physical properties.

In light of these discoveries, that which is claimed are heat-curable fluorosilicone rubber compositions which are curable by hydrosilation reactions and which can display outstanding physical characteristics, specifically improved transparency and processability.

We claim:

1. A heat-curable fluorosilicone rubber composition which yields a cured product having an optical clarity, comprising:

(A) a polydiorganosiloxane having at least two unsaturated aliphatic hydrocarbon groups and represented by the general formula (1):

wherein R$^1$ represents a substituted or unsubstituted monovalent hydrocarbon group containing 10 to 55 mol % of a fluoroalkyl group having 1 to 10 carbon atoms and 0.01 to 15 mole % of an unsaturated aliphatic hydrocarbon group, a is a positive number of from 1.95 to 2.05, (B) a polyorganohydrogensiloxane having 4, 5 or 6 hydrogen atoms directly bonded to silicon atoms in a molecule and represented by the general formula:

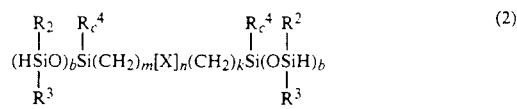

wherein R$^2$, R$^3$, and R$^4$ independently represent a substituted or unsubstituted monovalent hydrocarbon group, X represents CF$_2$ or C$_3$F$_6$O, b is equal to 2 or 3, c is equal to 0 or 1, b+c=3, m is an integer of 2 or more, n is an integer of 1 or more, and k is an integer of 2 or more, (C) a silica filler having a specific surface area of at least 50 m$^2$/g, and (D) an addition reaction catalyst.

2. The composition of claim 1 wherein the polyorganohydrogensiloxane of formula (2) is present in such an amount that a ratio of the mole percent of HSi groups contained therein to the total mole percent of unsaturated aliphatic hydrocarbon groups contained in polydiorganosiloxane (A) is in the range of 0.5 to 5.

3. The composition of claim 1 wherein the silica filler is blended in an amount of 1 to 100 parts by weight per 100 parts by weight of component (A).

4. A fluorosilicone rubber which is obtained by curing the heat-curable fluorosilicone rubber composition of claim 1.

5. The composition according to claim 1, wherein said unsaturated aliphatic hydrocarbon group of formula (1) contains 2 to 8 carbon atoms.

6. The composition according to claim 1, wherein 20 to 55% of said $R^1$ groups are represented by said fluoroalkyl group.

7. The composition according to claim 1, wherein said polydiorganosiloxane of component (A) is a trifluoropropylmethylpolysiloxane which contains vinyl groups, allyl groups, or both, in a total amount of 0.01 to 15 mole %.

8. The composition according to claim 1, wherein said polyorganohydrogensiloxane component (B) is present in an amount of from 0.05 to 10 parts by weight per 100 parts by weight of component (A).

9. The composition according to claim 8, wherein said polyorganohydrogensiloxane component (B) is present in an amount of from 0.05 to 5 parts by weight per 100 parts by weight of component (A).

10. The composition according to claim 1, wherein said catalyst component (D) is a soluble platinum compound.

* * * * *